United States Patent [19]

Orman et al.

[11] Patent Number: 4,785,674
[45] Date of Patent: Nov. 22, 1988

[54] TORQUE SENSOR

[76] Inventors: Gary M. Orman, 5001 E. Orchid La., Paradise Valley, Ariz. 85253; Rodney E. Schwartz, 2404 E. Geneva Dr., Tempe, Ariz. 85282; Gary C. Jorgensen, 2108 E. Vista Dr., Phoenix, Ariz. 85022

[21] Appl. No.: 5,037
[22] Filed: Jan. 20, 1987
[51] Int. Cl.$^4$ .............................. G01L 3/22; A61B 5/22
[52] U.S. Cl. .............................. 73/862.17; 73/862.31; 272/129
[58] Field of Search ............... 73/379, 862.17, 862.18, 73/862.31; 272/129, DIG. 6

[56] References Cited

U.S. PATENT DOCUMENTS

| | | | |
|---|---|---|---|
| 2,348,175 | 5/1944 | Cripps | 73/862.17 X |
| 2,511,674 | 6/1950 | Martin | 73/862.17 X |
| 3,710,874 | 1/1973 | Seccombe et al. | 73/862.29 X |
| 3,858,444 | 1/1975 | Wallace | 73/862.31 X |
| 4,691,694 | 9/1987 | Boyd et al. | 272/129 X |

Primary Examiner—Charles A. Ruehl
Attorney, Agent, or Firm—Darby & Darby

[57] ABSTRACT

An arrangement for sensing rotational torque in an exercise machine utilizes a torque measuring collar, which is generally tubular with a flange at each end. One flange is mounted to a stationary member, such as the frame of a machine. A shaft which is to rotate when the force is applied extends through the tubular collar to a gear box which itself is mounted only to the other flange of the torque collar and is therefore freely rotatable. The flange of the collar which is mounted to the gear box attempts to rotate in response to the torque (force) applied to the machine shaft by the user. This causes the collar to rotationally deform, i.e. twist, in the area between its two flanges. This torque proportional deformation effect occurs independent of the rotation position of the shaft as it rotates either direction through continuous circular motion. A suitable sensor, such as a strain gauge, measures the amount of twisting of the collar and converts it into an electrical signal which is proportional to the force applied by the user. This signal can be used, for example, to control the resistance that is to be overcome or worked against by the force applied to the rotational shaft.

18 Claims, 2 Drawing Sheets

TORQUE SENSOR

BACKGROUND OF THE INVENTION

Various application exist where it is desired to measure the torque applied by a user. In some applications the measured torque is used to produce a control signal which then performs another function.

The present invention is directed to a torque sensor for a device which includes a rotatable member. Such device can be, for example, an exercise machine, where the user grasps a handle, wheel, or bar and rotates it against a resistance to produce a torque force to achieve the effect of performing a desired type of exercise.

In a machine where a member is rotated against a resistance, the rotational torque, corresponding to the force that is being applied which is to be measured, the measurement of the torque can be made for evaluation purposes. Also, the torque measured can be used to produce a signal for controlling an arrangement for producing a resistance so that it can be maintained, or changed, to accommodate a particular applied force which is to work against the resistance.

The present invention is described with respect to an exercise mechanism although it can be used on any device in which torque is to be sensed. In a product line of exercise equipment, a wide range of torques may be applied by the user, since differing strengths of individuals and limbs are involved.

In addition, a speed control system must be considerably faster than the unit it is controlling. This means that a torque sensor and its associated components should respond quickly and preferably provide continuously available data to a high-speed microprocessor control system.

The flexibility to be able to sense torque applied to a continuously rotating shaft in either direction assists greatly in designing a variety of machines, including exercise apparatus that control cables or pulleys and makes human interaction to levers in differing positions and moving in differing directions for varying amounts of angular displacement much easier.

BRIEF SUMMARY OF THE PRESENT INVENTION

The present invention relates to a novel arrangement for sensing rotational torque. In accordance with the invention, a novel torque measuring collar is provided. The torque collar is generally tubular with a flange at each end. One flange is mounted to a stationary member, such as the frame of a machine. A shaft which is to rotate when the force is applied extends through the tubular collar to a gear box which itself is mounted only to the other flange of the torque collar and hence freely rotatable. The flange of the collar which is mounted to the gear box attempts to rotate in response to the torque (force) applied to the machine shaft by the user. This causes the collar to deform, i.e. twist, in the area between its two flanges. This torque proportional deformation effect occurs independent of the rotation position of the shaft as it rotates either direction through continuous circular motion.

A suitable sensor, such as a strain gauge, measures the amount of twisting of the collar and converts it into an electrical signal which is proportional to the force applied by the user. This signal can be used, for example, to control the resistance that is to be overcome or worked against by the force applied to the rotational shaft.

OBJECTS OF THE INVENTION

If is therefore an object of the present invention to provide an arrangement for sensing the force applied against a resistance.

A further object is to provide an arrangement for measuring the force applied upon rotating a shaft of a machine for a full 360° or greater in either direction by sensing the torque produced by such rotation without the use of slip rings or wiring connections to the rotating shaft.

Still a further object is to provide a device for measuring the force applied by a user in rotating a shaft against a resistance by sensing the torque applied to a collar through which the rotating shaft extends.

Another object is to provide a novel torque sensor for an exercise machine in the form of a collar through which a shaft to be rotated by the user extends, the torque produced on the collar corresponding to the force applied by the user to the shaft.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
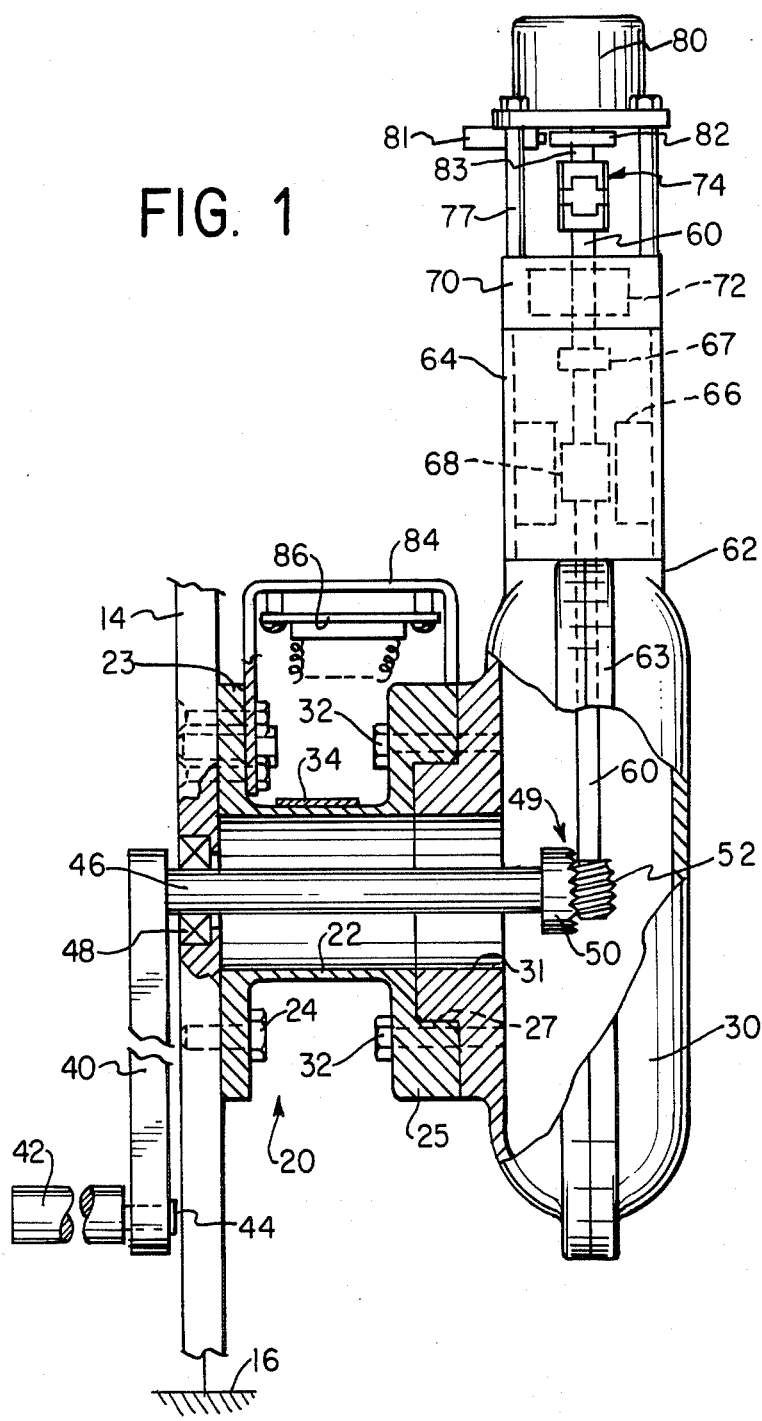
FIG. 1 is an overall plan view showing the torque sensing device.

FIG. 1 shows the torque sensing collar 20 of the present invention as configured in a torque sensing arrangement for a machine. Reference numeral 14 indicates a frame member, or panel attached to the frame, for the machine. Member 14 is of any suitable material, such as steel, aluminum, etc. Member 14 is shown as being stationary at 16 which can be the machine resting on the floor or ground.

The torque collar 20 has a generally thin-walled central tubular section 22 of generally cylindrical shape. An annular flange 23 and 25 is formed at each end of the tubular section. Each flange is of larger diameter than the central section 22 and is thicker than the wall of the central section. The torque collar 20 is preferable made from a single piece of material, for example aluminum, which is machined to the appropriate shape and dimensions. Aluminum is an easily machinable material.

The left hand flange 23 of the torque collar is mounted to the stationary member 14 of the machine. The right hand flange 25 has a recess 27 around the collar's central opening to accommodate the mounting shank 31 of a gear box 30 which is mounted to the collar by any suitable arrangement such as, for example, bolts 32 which extend from the inner wall of flange 25 into the gear box. The gear box 30 is mounted only to the torque collar.

One or more strain gauges 34 are mounted to the central portion 22 of the collar. The strain gauges are of conventional construction and react to their physical deformation to produce a change in resistance, capacitance or some other parameter. The strain gauges are arranged in an electronic circuit to eventually produce a variation in a change in voltage, so that the torque applied to the object to which they are mounted is measured. A preferred strain gauge mounting and circuit are described below.

The force is applied via a bar, or wheel, 40. For example, the user of the device rotates member 40 by pushing or pulling on a handle 42 rotatably mounted at the end of the bar with his hand(s) or foot (feet). If in an exercise machine, the bar 40 and handle 42 are configured and located so that a user can exercise any part of his body while either standing or lying on the floor or on an exercise bench. Depending upon the force application device, the location and configuration of member 40 are designed accordingly.

An input, or drive, shaft 46 is attached to the end of the bar 40 opposite handle 42. The shaft passes through bearings 48 in the member 14, these bearings being of any suitable fixed or moveable type, such as ball bearings. The shaft 46, whose diameter can be substantially the same size as, or somewhat smaller than, the opening through the collar's central section 22, passes therethrough into gear box 30. As seen, the collar central section 22 has a larger radius than the shaft and the two radii are independent of each other in making the torque measurement. However, larger collar radii can be used to handle more torque for measurement even if a relatively soft material such as aluminum is used.

A gear drive 49 (shown schematically), preferable a worm gear, is in the gear box 30. A driving gear 50 is fixedly attached to the end of the input shaft 46. It engages the driven gear 52 in the gear box. The worm gear configuration is back driven. That is, the driving gear 50 is larger than the driven gear 52.

As seen, the left end flange 23 of the torque collar 20 is mounted to the machine's stationary member 14 whereas the gear box 30 is mounted in a "floating" relationship relative to the machine's frame, to the right hand collar 25. Thus, as the user applies force to the handle 42 causing the bar 40 and the attached shaft 46 to rotate, the user applied force is transmitted from the driving gear 50 at the end of shaft 46 to the driven gear 52 in the gear box. This causes rotation not only of the driven gear 52 but also, to some lesser degree, rotation of the entire gear box 30 in the direction in which the user is turning the bar 40. The latter occurs since one flange 23 of collar 20 is fixedly mounted to the machine and the other flange 25 mounted to the gear box.

Thus, there will be a twisting force (torque) on the central portion 22 of the torque collar in the direction of the user applied force. The amount of torque applied to the collar's central section is proportional to the force applied by the user to the input shaft 46 times the length of the bar 40, which is the movement arm. The torque on the collar is produced for a full 360° rotation of the shaft in either direction. The torque applied to (twisting of) the collar and the direction of application is picked up by the strain gauges 34 and can be converted into an electrical signal indicative of the amount and direction of the applied force. The central section 22 of the collar will twist only a very small amount but this can be detected by the strain gauges.

As shown in FIG. 1, the driven gear 52 of the gear box is mounted on one end of an output shaft 60 of an electric motor 64. Shaft 60 passes through a bearing sleeve or bushing 63 which passes through output coupling section 62 on the gear box. The motor 64 is mounted to the gear box output section 62. The motor has (shown diagrammatically) the usual stator 66 on its outer wall. Shaft 60 has a rotor 68 thereon which is aligned with the stator 66. The shaft 60 within the motor 64 also carries a commutation ring through which the electrical input power is also supplied to motor 64. Motor 64 can be used to either aid the force applied, for example to overcome the inertia or losses of the gear box 30, or to provide additional force to be worked against. Motor 64 can be supported to the frame of the machine. This will not interfere with the rotation of the gear box.

Continuing from the output side of motor 64, the shaft 60 extends into and through a brake 70. The brake provides the major amount of resistance which is worked against. Brake 70 is preferably of the magnetic particle type. There is generally some type of an enlarged surface area, such as a flange 72 on the member to be braked, here the shaft 60. Depending upon the amount of current which is applied to the magnetic particle brake, more or less force is applied to the flange 72 to cause it and shaft 60 to be braked more or less. It is this magnetic particle brake 70 which provides the major part of the resistance which the user encounters when he rotates bar 40. Other types of electrically controlled brakes can be used, for example, an eddy current brake.

A mechanical coupling 74 is attached to the end of the output shaft 60. A quadrature speed sensor 80 is mounted to the housing of brake 70 by standoffs and bolts 77. The speed sensor 80 also picks up the direction of rotation of output shaft 60. The quadrature speed sensor 80 is conventional in the art. There is also a Hall effect sensor 81 mounted to the standoffs 77 adjacent a sectioned magnetic disc 82 mounted on the input shaft 83 to the quadrature speed sensor. Basically, a pulse is produced as each magnetic section of disc 82 passes by the Hall effect sensor 81. These pulses are processed in suitable circuits to produce an analog or digital signal corresponding to the speed of rotation of shaft 60. Such devices are also well known in the art.

The speed sensor 80 also can have suitable circuitry to measure the angular position of the output shaft. Such devices are also well known.

To minimize electronic noise, which would affect the accuracy of the torque measurement, the electronics for the torque measuring circuit are mounted directly on the collar 20 close to the strain gauges 34. As shown in FIG. 1, an inverted L shaped bracket 84 is mounted to the collar. The circuit board 86 containing the torque measuring circuit electronics is mounted to the bracket.

Two sets of two strain gauges each are mounted on the torque collar. They are mounted 90 to each other and 45 to the direction of the measured torque. The two sets are preferably mounted on the central section of the collar in positions 90 apart on the arc of the collar.

Figure 2:
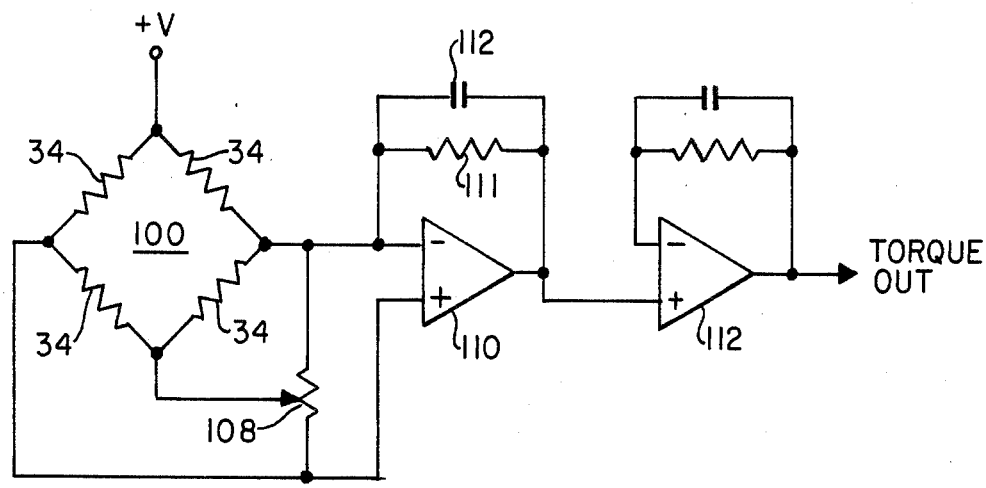
FIG. 2 is a schematic diagram of the torque measuring circuit.

A strain gauge circuit is shown in FIG. 2. The strain gauges are connected in a four-arm (Wheatstone Bridge) electrical network 100. The resulting adding and subtracting effect compensates for temperature effects as well as cancellation of signals by extraneous, that is, non-rotational torque, loading.

Conventional technology would mount these strain gauges on a rotating shaft and either bring the signals off the shaft via slip rings or inhibit the motion of the shaft with wire connections. The signal noise and reliability problems associated with these approaches are not desirable, and this allows the shaft on which torque is being measured to rotate without the strain gauges moving. That is, the central section of the collar on which the strain gauges are mounted is for all intents and purposes stationary.

The upper corner of the bridge is connected to the voltage source +V. The lower corner of the bridge is connected to the center arm of a balancing potentiometer 108 whose ends are connected to the positive and negative (+ and −) input of an operational amplifier 110. The left corner of the bridge 100 is connected to the positive input and the right corner to the negative input. The usual parallel combination of a resistor 111 and capacitor 112 is connected from the output to the negative input of the amplifier 110 to stabilize its operation.

Depending upon the amount of force applied by the user to shaft 46, the amount of twisting of the central section of torque collar 20 varies in a known relationship. This causes the resistances of the elements of the strain gauges 34 to change accordingly. The change in the resistance elements is increasing or decreasing depending upon the amount and direction of twisting of the torque collar, thus corresponding to the force applied to the bar 40 by the user.

Figure 3:
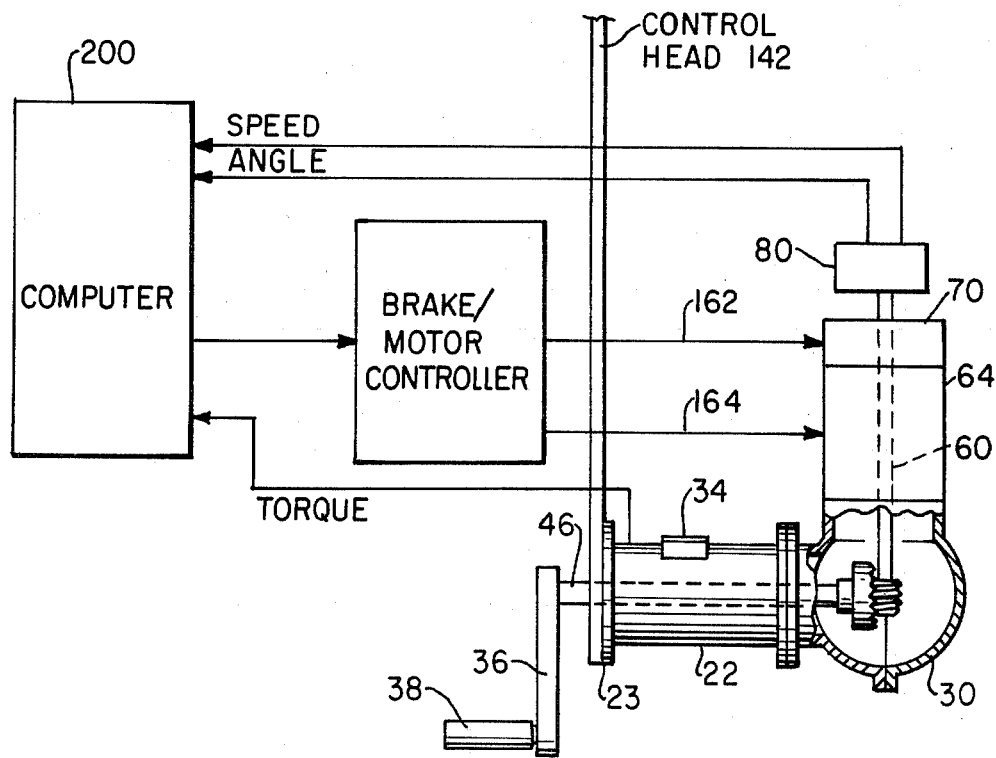
FIG. 3 is a schematic diagram of an overall electrical/electronic system in which the torque collar is used.

FIG. 3 is a schematic of a generalized version of a system with which the torque collar can be used. A computer 200 of any suitable type is used which receives the speed and angle signals from the sensor 80 and the torque signal from amplifier 112. The computer is programmed to use these signals, at least measured torque and speed, to produce a control signal which is applied to a brake/motor controller circuit 160. That is, the computer can have a program to set an applied force to the brake at a particular angular position of shaft 46, produce a constant resistance, etc. This is accomplished by the computer producing an output signal which is applied to the brake/motor controller 160. The latter produces the necessary signals to control brake 70 and motor 64 to produce this desired force.

If the machine is an exercise machine, the computer is programmed/programmable to give various types of exercise force curves, preferably for different modes of exercises.

The changes in resistance at the arms of the strain gauge bridge 100 are applied to the inputs of the operational amplifier 110. If the bridge 100 is balanced, no torque is being applied to collar 20. As the collar twists, the amplifier 110 has an unbalanced input which is amplified by an amount depending upon the amount of change of resistance of the bridge arms, corresponding to the amount of force applied, and going positive or negative depending on the direction of the application of the force, i.e., the direction of rotation of shaft 46.

The output of the operational amplifier 110 is applied to another amplifier circuit 112 so that the signal can be conditioned and brought to any desired level for operational purposes.

For a given strain gauge and amplifier, the range of applied torques and the type of material being used to fabricate the torque collar will determine the wall thickness of the tubular portion of the collar. A standard set of strain gauges and amplifiers can be stocked and varying applications of different torque values can be satisfied by boring out the internal diameter of the torque collar. In addition, the diameter of the torque collar can be considerably greater than that of the shaft being measured causing less strain per unit area than in the shaft and thereby facilitating the use of soft machinable metals, such as aluminum, for the torque collar.

We claim:
1. Torque measuring apparatus for an exercise machine of the type including a stationary member supported on the ground, comprising:
   means rotatable by a user for receiving a force provided by the user,
   means for providing a resistance to oppose the force provided by the user, said resistance providing means being constructed to permit application of a predetermined resistance force, while permitting rotation of said rotatable means,
   means for coupling said rotatable means to said resistance providing means,
   said coupling means also rotating by an amount and direction corresponding to the amount and direction of force applied by the user to said rotatable means,
   torque responsive means having one end connected to said coupling means and the other end to said stationary member, the portion between said ends twisting in response to the rotation of said coupling means,
   and means for sensing the amount of twisting of said portion and producing an electrical signal corresponding thereto.

2. Torque measuring apparatus as in claim 1 wherein said torque responsive means comprises a collar having a flange at each end, one said flange connected to said coupling means and the other said flange connected to said stationary member, the portion between said two flanges being tubular.

3. Apparatus as in claim 2, wherein said rotatable means is a shaft extending through said collar.

4. Apparatus as in claim 2, wherein said collar is of aluminum.

5. Torque measuring apparatus as in claim 2 wherein said sensing means comprise strain gauge means attached to said tubular portion.

6. Torque measuring apparatus as in claim 5 wherein said rotatable means comprises a shaft which extends through said collar.

7. Torque measuring apparatus as in claim 6 wherein said coupling means comprises gear means, and means on said shaft for engaging said gear means.

8. Torque measuring apparatus as in claim 7 wherein said gear means comprises a back driven worm gear.

9. Torque measuring apparatus as in claim 7 wherein said gear means has output means, said output means being coupled to said resistance providing means.

10. Apparatus as in claim 9 further comprising electric motor means coupled to said output means of said gear means to provide additional resistance.

11. Torque measuring apparatus as in claim 7 further comprising means for measuring the speed of rotation of said rotatable shaft.

12. Apparatus in accordance with claim 6, wherein said coupling means comprises gear means and means on said shaft for engaging said gear means, said gear means being constructed to achieve a speed increase compared to the rotational speed of said shaft.

13. Apparatus in accordance with claim 5, wherein said strain gauge means comprises four strain gauges attached in a diamond-shaped bridge configuration, the strain gauges being mounted on said tubular portion so as to form angles of 90 degrees and so as to be positioned at an angle of 45 degrees relative to said shaft, whereby said strain gauges compensate for non-rotational torque loading.

14. Torque sensing means as in claim 2, wherein said sensing means comprises electronic circuit means, the thickness of the tubular portion of said collar determining the amount of torque which can be sensed.

15. Apparatus as in claim 14, wherein said sensing means further comprises strain gauge means fixed to said tubular portion of said collar having an output via a lead to said circuit means.

16. Apparatus as in claim 15, wherein said circuit means are stationarily mounted.

17. Torque measuring apparatus comprising:
- means for providing a resistance, said resistance providing means comprising electrically operated brake means,
- means rotatable by a user to work against the force provided by said resistance means, said rotatable means comprising a shaft,
- means for coupling said rotatable means to said resistance providing means,
- said coupling means also rotating by an amount and direction corresponding to the amount and direction of force applied by the user to said rotatable means, said coupling means comprising gear means having output means coupled to said resistance providing means, and means on said shaft for engaging said gear means,
- torque responsive means having one end connected to said coupling means and the other end to a stationary member, the portion between said ends twisting in response to the rotation of said coupling means, said torque responsive means comprising a collar having a flange at each end, said shaft extending through said collar, one said flange connected to said coupling means and the other said flange connected to said stationary member, the portion between said two flanges being tubular,
- and means for sensing the amount of twisting of said portion and producing an electrical signal corresponding thereto.

18. Torque measuring apparatus as in claim 17 wherein said electrically operated brake means comprises a magnetic particle type brake.

* * * * *